(12) United States Patent
Becocci

(10) Patent No.: US 8,813,782 B2
(45) Date of Patent: Aug. 26, 2014

(54) HYDRAULIC FITTING FOR PIPES

(75) Inventor: Andrea Becocci, Prato (IT)

(73) Assignee: Formula S.A.S. di "Formula Group S.R.L.", Prato (IT)

( * ) Notice: Subject to any disclaimer, the term of this patent is extended or adjusted under 35 U.S.C. 154(b) by 160 days.

(21) Appl. No.: 13/233,586

(22) Filed: Sep. 15, 2011

(65) Prior Publication Data

US 2012/0067038 A1  Mar. 22, 2012

(30) Foreign Application Priority Data

Sep. 16, 2010  (IT) ................ FI2010A0191

(51) Int. Cl.
*F16L 37/34* (2006.01)
*F16L 37/35* (2006.01)

(52) U.S. Cl.
USPC ................ 137/614.03; 137/614.04

(58) Field of Classification Search
USPC ...................... 137/614.03–614.05
See application file for complete search history.

(56) References Cited

U.S. PATENT DOCUMENTS

| | | | | | |
|---|---|---|---|---|---|
| 1,205,686 | A | * | 11/1916 | Uhl | 137/614.03 |
| 2,208,286 | A | * | 7/1940 | Berger | 137/614.03 |
| 3,213,884 | A | * | 10/1965 | Moyer et al. | 137/614.03 |
| 3,938,564 | A | * | 2/1976 | Jones | 137/614.03 |
| 4,219,048 | A | * | 8/1980 | Ekman | 137/614.03 |
| 4,429,713 | A | * | 2/1984 | Walter | 137/614.03 |
| 5,482,083 | A | * | 1/1996 | Jenski | 137/614.03 |
| 6,032,691 | A | * | 3/2000 | Powell et al. | 137/614.04 |
| 8,047,229 | B2 | * | 11/2011 | Adams et al. | 137/614.03 |

* cited by examiner

*Primary Examiner* — Kevin Lee
(74) *Attorney, Agent, or Firm* — McGlew and Tuttle, P.C.

(57) ABSTRACT

A hydraulic fast fitting for hydraulic pipes, including a first fitting element (1) in fluid communication with a first pipe (2), provided with a first valve (3) for opening and closing the fluid communication with the first pipe (2), and a second fitting element (5), provided with a second valve (6) for opening or closing a fluid communication with a second pipe (7), and further including a removable fast-coupling device (19) for connecting said first and second fitting elements (1, 5) and establishing a fluid communication between said first and second pipes (2, 7).

20 Claims, 2 Drawing Sheets

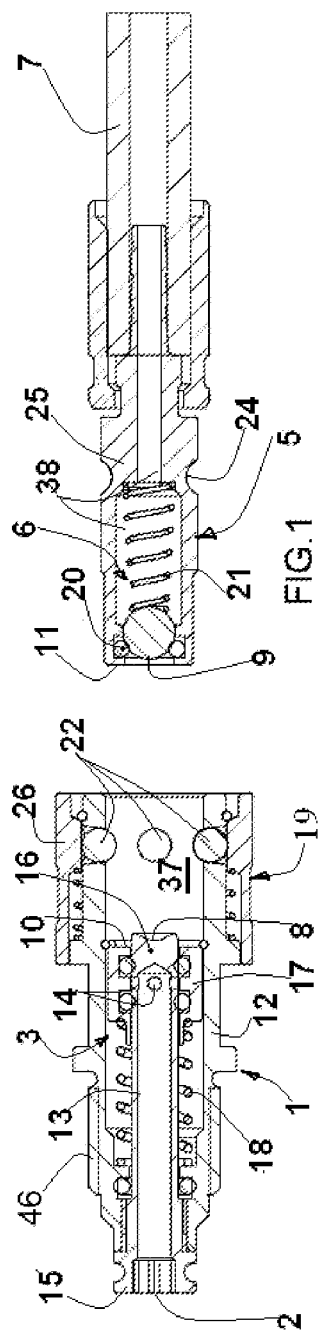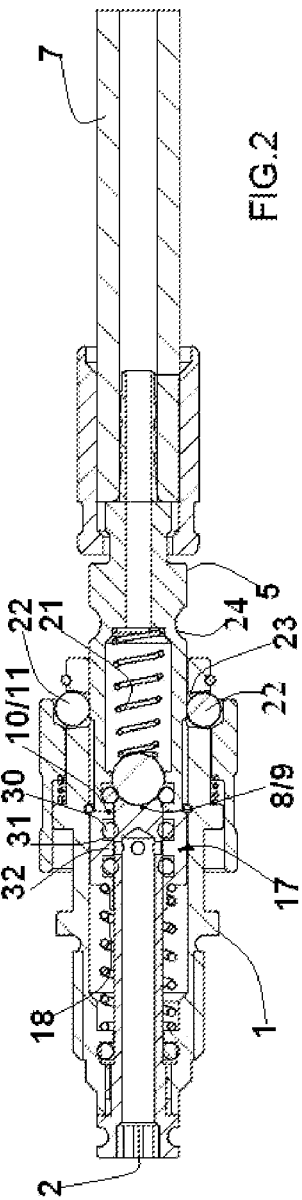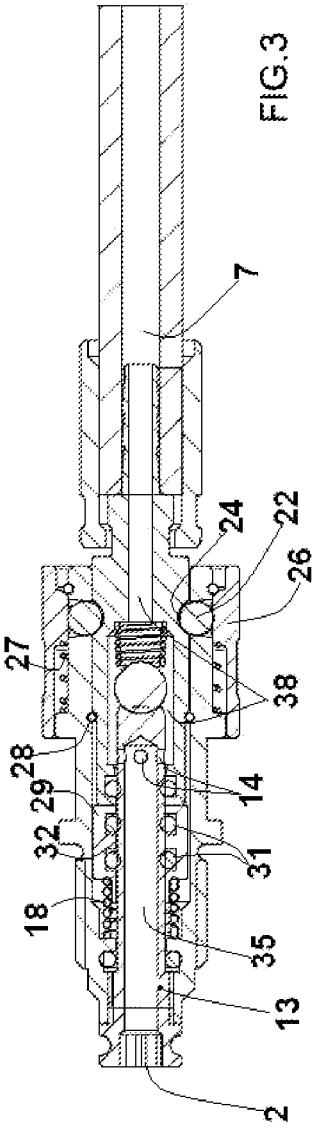

HYDRAULIC FITTING FOR PIPES

FIELD OF THE INVENTION

The invention relates to a fitting for pipes of the type used for coupling the pipes for conveying a fluid under pressure to a hydraulic circuit.

More in particular, the invention finds application in the sector of hydraulic brakes, and in general in the sector of circuits for hydraulic actuators, for bicycles and motorcycles.

In these systems, the fluid under pressure is conveyed by means of flexible pipes by the pump body, where compression of the fluid is generated, up to the actuator proper, i.e., the calliper of the brake.

During the life of the hydraulic circuit, as also in the operations of assembly or replacement of the components, the pipes must hence be detached and attached to set up the hydraulic connection.

In these operations, it is essential that no leakage of fluid should occur and that no air bubbles should enter the circuit, which would render operation of the brake unstable or ineffective, this being the reason why, in the current state of the art, an operation referred to as "bleeding" is frequently carried out for removal of the air from the hydraulic circuit.

State of the Art

In the current state of the art, fast connectors are known, devised to set up the connection between pipes or between a pipe and a hydraulic device of the circuit without any leakage of fluid and without introducing air bubbles.

Devices of a known type present, however, the drawback of having a certain structural complexity, in addition to weights and dimensions that are not always compatible with their use in applications that require maximum reduction of weight, for example in the sector of bicycles or motorcycles for sports competitions.

Aim of the Invention

With the present invention, it is intended to overcome the drawbacks of the solutions already known and to propose a fast fitting for pipes of hydraulic circuits that is simple to produce, reliable in use, and of reduced dimensions and weights.

SUMMARY OF THE INVENTION

The above purposes have been achieved by providing a fast fitting according to the annexed claims.

A first advantage of the invention consists in the rapidity and reliability of the contact obtained between the jointed pipes.

A second advantage consists in the ease of opening and closing of the fitting.

A third advantage consists in the reduced dimensions of the fitting, which enable passage thereof inside the tubular frame of bicycles.

LIST OF DRAWINGS

The above and further advantages will be better understood by any person skilled in the branch from the ensuing description and the annexed drawings, which are provided purely as non-limiting example and in which:

FIG. 1-3 show successive positions assumed by the two ends of the fitting, respectively in the detached configuration, in the configuration of initial contact, and in the configuration of complete engagement;

DETAILED DESCRIPTION

With reference to the drawings, a preferred embodiment of a hydraulic fast fitting according to the invention is illustrated.

The fitting comprises a first fitting element 1 in fluid communication with a first pipe 2, which can be connected, for example, to a pump body or to a brake calliper, or to some other hydraulic actuator via a first valve 3 capable of opening and closing the fluid communication.

Figure 4:
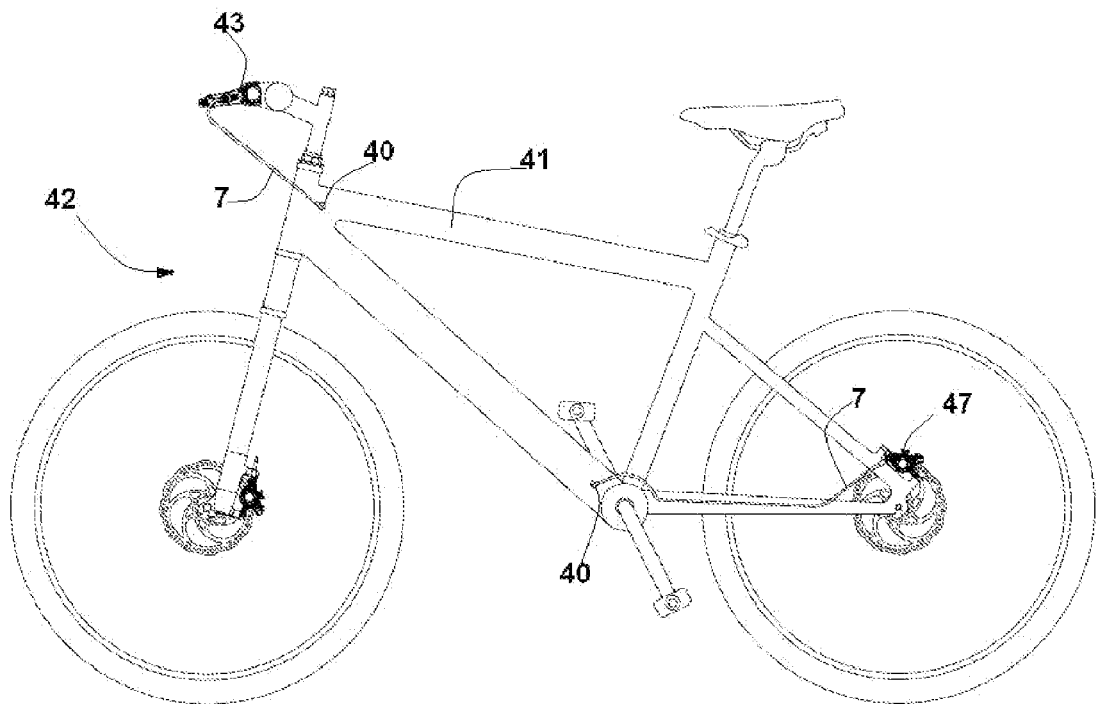
FIG. 4 shows a bicycle equipped with a hydraulic circuit with the fitting illustrated in FIGS. 1-3.

The element 1 is designed to connect up to a second fitting element 5, which is in turn provided with a second valve 6 for opening or closing a fluid communication with a second pipe 7, for example a pipe for connection between a pump body 43 and a brake calliper 47 of a bicycle 41, as represented schematically in FIG. 4.

The two fitting elements 1, 5 can be joined via removable fast-coupling means 21 to set up a fluid communication between said first and second pipes 2, 7. Normally, i.e., in the condition of detachment of the fitting elements 1, 5, both the first valve 3 and the second valve 6 are in the closing position and both pass into the opening position only in the condition of connection of the fitting elements 1, 5, as represented schematically in FIG. 3.

According to the invention, the valve 3 is provided with first contact surfaces 8, 10, which can be superimposed precisely on respective second contact surfaces 9, 11 of the valve 6, so that the pairs of contact surfaces 8/9 and 10/11 are superimposed without intermediate empty spaces and are mobile with respect to one another at the moment of connection of the two fitting elements 1 and 5, in order to pass between a position for closing and a position for opening fluid communication between said first and second pipes 2, 7.

In the example of embodiment described, the first fitting element 1 comprises a tubular body 12, inserted inside which is a hollow cylindrical pin 13 via a seal 34.

The pin 13 has a cavity 35, which communicates at its outer end with the pipe 2 whilst it communicates with the tubular body 12 via radial holes 14 located in the proximity of the inner end 16, which terminates with the first contact surface 8, which preferably presents a spherical geometry.

Along the pin 13 there can slide in a fluid-tight way a moving element 17, which is provided with the second contact surface 10, preferably of planar geometry, and is mobile inside the body 12 against the thrust of a spring 18 so as to open and close the radial communication holes 14 during its relative sliding with respect to the cylindrical stem of the pin 13.

Once again with reference to FIGS. 1-3, the second fitting element 5 is made up of a tubular element 25 with a cavity 38 that communicates towards the outside with the second pipe 7 and is provided, at its inner end 36, with a hole 36 for passage of the fluid and with a contact surface 11, which is designed in use to be superimposed on the contact surface 10 of the moving element 17 and, like the latter, has a planar geometry.

Inserted within the cavity 18 is a ball 9, which in use is designed to come into contact with the spherical surface 8 of the pin 13 and is kept normally in a position for closing the hole 36 by means of a gasket 20 and a thrust spring 21. In operation, and with reference to FIGS. 1-3, FIG. 1 shows the position of detachment where the surfaces 8/9 and 10/11 are separated and the respective valves 3, 6 close the pipes 2, 7 with the fluid that invades completely the internal cavities of the elements 1 and 5.

In FIG. 2, the fitting element 5 has entered the open chamber 37 of the body 12, and the contact surfaces 8/9 and 10/11 are superimposed precisely without the presence of any intermediate air, which is expelled into the open chamber 37 of the body 1. In this configuration, the moving element 17 is in the position for closing the holes 14 that remain comprised between the two gaskets 30, and the fluid completely invades, on one side, the hollow pin 13 as far as the holes 14 and, on the other, the cavity 18 of the element 5 as far as the ball 9. Advantageously, between the holes 14 and the ball 9 no air is present.

In FIG. 3, the element 5 has proceeded with its insertion into the body 12 until it is blocked inside it by the reversible-connection means 21.

In this configuration, the element 5 has pushed the moving element 17 to recede along the pin 13 until the holes 14 a re uncovered and the fluid communication is set up between the internal cavity of the pin 13 and the body 12 and consequently, in succession, between the first pipe 2, the cavity of the pin 13, the body 12, the cavity 18 of the element 5, and finally the pipe 7.

In a preferred embodiment, the moving element 17 comprises a tubular cylindrical body 29, in which two seats 30 are made for respective seals 31, which are separated by an intermediate ring 32 and in the configuration of closing of the valve 3 are located on the two sides of the holes 14.

According to the invention, the removable fast-coupling means 21 are of the snap-action type and comprise a distribution of balls 22 arranged in radial holes 23 made along a circumference of the open chamber 37 of the body 12, and a corresponding distribution of spherical cavities 24 made externally on the tubular element 25.

Set outside the chamber 37 is a collar 26, which slides on the tubular body 12 in order to pass, against the thrust of a spring 27, between an advanced position of forced withholding of the balls 22 within the cavities 24, and a retracted position of radial release of the balls 22.

In operation, when the element 5 is completely inserted in the body 12 (FIG. 3), the balls enter the cavities 24, and the spring 27 pushes the collar 26 forwards to cover the balls and block the two elements 1, 5 with respect to one another.

To release the fitting it will be sufficient to move back the collar 26 manually against the spring 27 and move the two elements 1, 5 apart.

Figure 5:
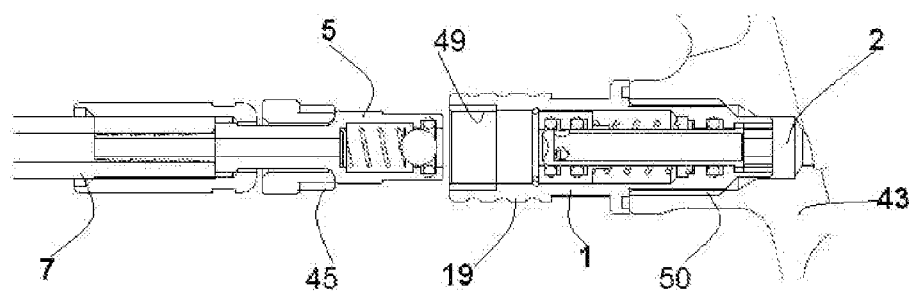
FIG. 5 shows the fitting of FIGS. 1-3 in the detached configuration for connection of a hydraulic actuator to a pipe.

In preferred embodiments, the removable blocking means 19 can be constituted by a threaded ring nut 45 provided on the element 5 for fixing to a corresponding thread 49 provided on the element 1, which is in turn mounted, by means of a threaded coupling 50, to an actuator 43, for example a pump body of a hydraulic brake, as represented schematically in FIG. 5.

Advantageously, the fitting according to the invention enables rotation of the pipe 7 without inducing stresses and without any loss of fluid tightness.

According to an advantageous characteristic of the invention, the position of maximum advance of the moving element 17 in the body 12 is delimited by an internal contrast surface 28, for example a seal ring, which has a diameter smaller than the external diameter of the moving element 17 in a region corresponding to the contact surface 10, but larger than the external diameter of the tubular element 25 in a region corresponding to the contact surface 11, in such a way as to define the point of encounter of the surfaces 10/11 and enable further movement of the element 5 by recession of the moving element 17 and thus enable passage of the fluid through the fitting.

The invention achieves important advantages in so far as its use does not entail the introduction of air into the hydraulic circuit of the bicycle or motorcycle, nor even inside the connection pipe 2.

It thus becomes possible to transport complete hydraulic brakes (for example, pump body, cables, and hydraulic callipers for disk brakes) and simply connect them with the fitting of the invention, without the need to fill the circuits once they are assembled, nor to carry out operations of bleeding for removing the air from the hydraulic systems.

Furthermore, the extremely small size of the fitting element 5 enables use of pipes 2 passing through holes 40 of a tubular frame 41 also of a bicycle 42 (FIG. 4), without weakening the structure of the frame.

The invention has been described with reference to a preferred embodiment, but it is understood that equivalent modifications may be made thereto, without thereby departing from the sphere of protection granted to the present industrial patent right.

The invention claimed is:

1. A hydraulic fitting for hydraulic pipes, comprising:
a first fitting element in fluid communication with a first pipe, provided with a first valve for opening and closing the fluid communication with the first pipe;
a second fitting element provided with a second valve for opening or closing a fluid communication with a second pipe;
a removable means for connecting said first and second fitting elements and establishing a fluid communication between said first pipe and said second pipe, wherein said first and second valves are normally in a closing position and pass both into the opening position in the condition of connection of said first and second fitting elements, said first and second valves comprising respective first contact surfaces, which can be superimposed precisely, and respective second contact surfaces, which can also be superimposed precisely and are mobile with respect to the first contact surfaces in order to pass between a position of closing and a position of opening of the fluid communication between said first and second pipes, wherein said first fitting element comprises a tubular body and a hollow cylindrical pin, inserted in a fluid-tight way inside the body, said hollow cylindrical pin comprising radial holes, wherein said cylindrical pin can communicate with said body through said radial holes, said pin communicating at an outer end with said first pipe, while being provided at the inner end with a first contact surface with spherical geometry, said first fitting element further comprising a moving element, mobile inside the body against the thrust of a spring and slidable in a fluid-tight way on said pin for opening/closing said radial communication holes, the moving element being provided at one end with said second contact surface with plane geometry, said second fitting element comprising a tubular element having an internal cavity, which communicates with said second pipe and is provided at the inner end with said second contact surface designed to come into contact in use with the contact surface of the moving element, said moving element comprising a cylindrical body, said cylindrical body comprising two seats housing respective seal gaskets for opening/closing said radial communication holes, said seal gaskets being separated by an intermediate ring, said second fitting element further comprising a ball, designed to come into contact in use with the spherical surface of the pin and arranged so that said ball can move inside the cavity being kept normally in the closing position against a gasket by a thrust spring.

2. The fitting according to claim 1, wherein said removable connection means is a fast-block coupling means.

3. The fitting according to claim 2, wherein said fast-coupling means comprises:
   a distribution of balls, arranged in radial holes of the body;
   a distribution of spherical cavities, made externally on the tubular element in a position corresponding to the distribution of balls; and
   a collar, arranged so that said collar can slide on the tubular body in order to pass between a position of forced withholding of the balls inside the cavity and a position of radial release of the balls.

4. The fitting according to claim 3, wherein said collar is kept normally in a position of withholding of the balls by a thrust spring.

5. The fitting according to claim 1, wherein said removable connection means comprises a threaded connection between said fitting elements.

6. The fitting according to claim 1, wherein a position of maximum advance of the moving element in the body is delimited by an internal contrast surface having a diameter smaller than the external diameter of the moving element in a region corresponding to the contact surface and greater than the external diameter of the tubular element in a region corresponding to the contact surface.

7. The fitting according to claim 1, wherein said first fitting element and said second fitting element are free to rotate with respect to one another without loss of fluid-tightness and without inducing stresses in the connected pipes.

8. A hydraulic fitting for hydraulic pipes, comprising:
   a first fitting element in fluid communication with a first pipe, said first fitting element being provided with a first valve for opening and closing the fluid communication with the first pipe;
   a second fitting element provided with a second valve for opening or closing a fluid communication with a second pipe;
   a removable means for connecting said first fitting element and said second fitting element and for establishing a fluid communication between said first pipe and said second pipe, wherein said first valve and second valve are normally in a closing position and pass both into the opening position in the condition of connection of said first element and said second fitting element, said first and second valves comprising respective first contact surfaces, which can be superimposed, and respective second contact surfaces, which can be superimposed and are mobile with respect to the first contact surfaces in order to pass between a position of closing and a position of opening of the fluid communication between said first and second pipes, wherein said first fitting element comprises a tubular body and a hollow cylindrical pin, inserted in a fluid-tight way inside the body, said hollow cylindrical pin comprising radial holes, wherein said cylindrical pin can communicate with said body through said radial holes, said pin communicating at an outer end with said first pipe, said first fitting element further comprising a moving element, mobile inside the body against the thrust of a spring and slidable in a fluid-tight way on said pin for opening/closing said radial communication holes, said moving element comprising two seats for housing respective seal gaskets for opening/closing said radial communication holes.

9. A hydraulic fitting for hydraulic pipes, comprising:
   a first fitting element in fluid communication with a first pipe, said first fitting element comprising a first fitting element body, a hollow pin and a first valve for opening and closing fluid communication with the first pipe, said first valve comprising a movable element, said hollow pin comprising a plurality of radial holes, wherein said movable element is movable relative to said first fitting element body at least between a first movable element position and a second movable element position, said movable element comprising a first seat and a second seat;
   a first seal gasket arranged in said first seat;
   a second seal gasket arranged in said second seat;
   a second fitting element comprising a second valve for opening or closing fluid communication with a second pipe, said first fitting element and said second fitting element comprising a connected state and an unconnected state, said first fitting element being located at a spaced location from said second fitting element in said unconnected state, wherein fluid communication between said first fitting element body and said hollow pin is blocked with said movable element in said first movable element position and with said first fitting element and said second fitting element in said unconnected state, wherein said radial holes are in a closed position via said first seal gasket and said second seal gasket with said first movable element in said first movable element position and said first fitting element and said second fitting element in said unconnected state;
   a removable means for connecting said first fitting element and said second fitting element and for establishing fluid communication between said first pipe and said second pipe, wherein said first valve and said second valves are in a closed position with said first fitting element and said second fitting element in said unconnected state, said first valve and said second valve being in an opening position with said first fitting element and said second fitting element in said connected state, said first valve comprising a first valve first contact surface and a first valve second contact surface, said second valve comprising a second valve first contact surface and a second valve second contact surface, said second valve first contact surface and said second valve second contact surface being movable relative to said first valve first contact surface and said first valve second contact surface, said first valve first contact surface engaging said second valve first contact surface and said first valve second contact surface engaging said second valve second contact surface in said connected state, said hollow pin being in communication with said first fitting element body via said radial holes with said movable element in said second movable element position and with said first fitting element and said second fitting element in said connected state, said radial holes being located at a spaced location from said first seal gasket and said second seal gasket with said movable element in said second movable element position, wherein said first pipe is in fluid communication with said second pipe in said connected state.

10. The fitting according to claim 9, wherein said first fitting element body comprises a tubular body, said hollow pin comprising a cylindrical shape, said hollow pin comprising an outer end portion and an inner end portion, said outer end portion being in fluid communication with said first pipe, said inner end portion comprising said first valve first contact surface, said first valve first contact surface comprising a spherical geometry, said movable element being movable inside said tubular body against a force of a spring and said movable element being slidable in a fluid-tight way on said hollow pin for one or more of opening and closing said radial holes, said movable element comprising said first valve second contact surface at one end thereof, said first valve second contact surface comprising a planar surface, said second fitting element comprising a tubular element having an internal cavity, which communicates with said second pipe and is provided at an inner end with said second valve second contact surface, said second fitting element comprising a ball, said ball engaging said first valve first contact surface with said first fitting element and said second fitting element in said connected state, said ball being in a ball closed position against a gasket by a thrust spring with said first fitting element and said second fitting element in said unconnected state.

11. The fitting according to claim 10, wherein said removable connection means is a fast-block coupling means.

12. The fitting according to claim 11, wherein said fast-coupling means comprises:
a distribution of balls, arranged in radial holes of the body;
a distribution of spherical cavities, made externally on the tubular element in a position corresponding to the distribution of balls; and
a collar, arranged so that said collar can slide on the tubular body in order to pass between a position of forced withholding of the balls inside the cavity and a position of radial release of the balls.

13. The fitting according to claim 12, wherein said collar is kept normally in a position of withholding of the balls by a thrust spring.

14. The fitting according to claim 10, wherein said removable connection means comprises a threaded connection between said first fitting element and said second fitting element.

15. The fitting according to claim 10, wherein a position of maximum advance of the movable element in the body is delimited by an internal contrast surface having a diameter that is smaller than an external diameter of the movable element in a region corresponding to the first valve second contact surface and greater than an external diameter of a portion of said second fitting element in a region corresponding to the second valve second contact surface.

16. The fitting according to claim 10, wherein said movable element comprises a cylindrical body, said cylindrical comprising said first seat, said second seat and an intermediate ring, said first seat and said second seat being separated via said intermediate ring.

17. The fitting according to claim 10, wherein said first fitting element and said second fitting element are free to rotate with respect to one another without loss of fluid-tightness and without inducing stresses in the connected pipes.

18. The fitting according to claim 9, wherein said first seal gasket engages a first portion of said hollow pin and said second seal gasket engages a second portion of said hollow pin with said movable element in said first movable element position, said first portion of said hollow pin and said second portion of said hollow pin being located adjacent to said plurality of radial holes, said first seal gasket engaging a third portion of said hollow pin and said second seal gasket engaging a fourth portion of said hollow pin with said movable element in said second movable element position, said third portion of said hollow pin and said fourth portion of said hollow pin being located at a spaced location from said plurality of radial holes.

19. The fitting according to claim 9, wherein said movable element moves from said first movable element position to said second movable element position in an axial direction of said hollow pin, said radial holes being located between said first seal gasket and said second seal gasket with said movable element in said first movable element position.

20. The fitting according to claim 9, wherein said first seal gasket and said second seal gasket are in direct contact with said hollow pin.

* * * * *